(12) United States Patent
Suzuki

(10) Patent No.: US 11,816,366 B2
(45) Date of Patent: Nov. 14, 2023

(54) METHOD FOR SPECIFYING IMAGE FORMING APPARATUS IN WHICH NEWLY SHIPPED CARTRIDGE IS TO BE MOUNTED

(71) Applicant: BROTHER KOGYO KABUSHIKI KAISHA, Nagoya (JP)

(72) Inventor: Takashi Suzuki, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/532,623

(22) Filed: Nov. 22, 2021

(65) Prior Publication Data

US 2022/0171577 A1 Jun. 2, 2022

(30) Foreign Application Priority Data

Nov. 27, 2020 (JP) .................................. 2020-197570

(51) Int. Cl.
*G06F 3/12* (2006.01)
*G06Q 10/083* (2023.01)

(52) U.S. Cl.
CPC .......... *G06F 3/1203* (2013.01); *G06F 3/1225* (2013.01); *G06F 3/1231* (2013.01); *G06F 3/1285* (2013.01); *G06F 3/1293* (2013.01); *G06Q 10/083* (2013.01)

(58) Field of Classification Search
CPC .... G06F 3/1203; G06F 3/1225; G06F 3/1231; G06F 3/1285; G06F 3/1293; G06Q 10/083
See application file for complete search history.

(56) References Cited

U.S. PATENT DOCUMENTS

| 2012/0239791 A1* | 9/2012 | Takamoto | ............. G06F 3/1231 |
| | | | 709/222 |
| 2015/0220914 A1* | 8/2015 | Purves | ................... G06Q 20/36 |
| | | | 705/41 |
| 2018/0246685 A1* | 8/2018 | Simpson | ............... G06F 3/1229 |
| 2020/0226535 A1* | 7/2020 | Yoden | .................. G06Q 10/087 |

FOREIGN PATENT DOCUMENTS

WO 2017/078722 A1 11/2017

OTHER PUBLICATIONS

English Machine Translation of JP 2007-233603-A (Ikeda, Published Sep. 13, 2007) (Year: 2007).*

* cited by examiner

*Primary Examiner* — Juan M Guillermety
(74) *Attorney, Agent, or Firm* — Merchant & Gould P.C.

(57) ABSTRACT

The method includes determining, by using a first information processing device, whether a cartridge mounted in the specified image forming apparatus needs replacing. The method further includes attaching a label to the newly shipped cartridge capable of using in each of the plurality of image forming apparatuses or to a packing box packing the newly shipped cartridge. The label indicates specific information associated with identification information of the specified image forming apparatus in which the determining determines that the cartridge needs replacing. The specific information is retrieved from a database in which the identification information is associated with the specific information. The identification information identifies the each of the plurality of image forming apparatuses. The specific information specifies the each of the plurality of image forming apparatuses.

15 Claims, 8 Drawing Sheets

FIG. 8A

| DEVICE SETTINGS | PRINTER |
|---|---|
| WIRELESS COMMUNICATION | PRINTER A |
|  |     OFF-LINE |
| [PRINTER] |  |
|  | PRINTER A(COPY 1) |
| MOUSE |     OFF-LINE |
|  |  |
| . | PRINTER A(COPY 2) |
| . |  |
| . |  |
|  | PRINTER B |
|  |     OFF-LINE |
|  |  |
|  | PRINTER B(COPY 1) |
|  |     OFF-LINE |
|  |  |
|  | . |
|  | . |
|  | . |

FIG. 8B

| DEVICE SETTINGS | PRINTER |
|---|---|
| WIRELESS COMMUNICATION | PRINTER A |
|  |     OFF-LINE |
| [PRINTER] |  |
|  | PRINTER A(COPY 1) |
| MOUSE |     OFF-LINE |
|  |  |
| . | PRINTER A(4th Floor, East Side) |
| . |  |
| . |  |
|  | PRINTER B |
|  |     OFF-LINE |
|  |  |
|  | PRINTER B(COPY 1) |
|  |     OFF-LINE |
|  |  |
|  | . |
|  | . |
|  | . |

METHOD FOR SPECIFYING IMAGE FORMING APPARATUS IN WHICH NEWLY SHIPPED CARTRIDGE IS TO BE MOUNTED

CROSS REFERENCE TO RELATED APPLICATION

This application claims priority from Japanese Patent Application No. 2020-197570 filed Nov. 27, 2020. The entire content of the priority application is incorporated herein by reference.

BACKGROUND

There has been known a system including a printer fleet that includes a plurality of printers, and a server connected to the printer fleet via the Internet. In response to a request from a first printer in the printer fleet, the server in the system acquires identification information from a database. The identification information specifies cartridges that are mounted in each printer of the printer fleet. Based on the acquired identification information, the server determines whether the cartridge mounted in the first printer was previously mounted in a printer other than the first printer included in the printer fleet, and outputs determination results to the first printer.

SUMMARY

If a service agreement is concluded for the plurality of printers and cartridges can be used in the printers, a new cartridge is shipped whenever the remaining quantity of developer in a cartridge mounted in a printer drops to a threshold value or lower. However, when specific information specifying the printer in which the cartridge is to be mounted is not displayed on the new cartridge being shipped or the packing box for the cartridge, the user may be unable to specify the printer in which the newly shipped cartridge is to be mounted.

Although the conventional system determines whether a cartridge mounted in a certain printer of the printer fleet was previously mounted in another printer of the fleet based on the identification information described above, the system does not indicate such specific information on a newly shipped cartridge or packing box. Consequently, a user of the system may be unable to specify the printer in which a newly shipped cartridge is to be mounted.

It is an object of the present disclosure to specify the image forming apparatus in which a newly shipped cartridge is to be mounted from a plurality of image forming apparatuses enrolled in a service agreement.

In order to attain the above and other objects, according to one aspect, the disclosure provides a method for specifying a specified image forming apparatus in which a newly shipped cartridge is to be mounted from a plurality of image forming apparatuses. The plurality of image forming apparatuses is enrolled in a service agreement. The method includes determining, by using a first information processing device, whether a cartridge mounted in the specified image forming apparatus needs replacing. The cartridge is capable of using in each of the plurality of image forming apparatuses. The method further includes attaching a label to the newly shipped cartridge capable of using in each of the plurality of image forming apparatuses or to a packing box packing the newly shipped cartridge. The label indicates specific information associated with identification information of the specified image forming apparatus in which the determining determines that the cartridge needs replacing. The specific information is retrieved from a database in which the identification information is associated with the specific information. The identification information identifies the each of the plurality of image forming apparatuses. The specific information specifies the each of the plurality of image forming apparatuses.

According to the above configuration, by visually confirming the label affixed to the packing box or the newly shipped toner cartridge, the user can specify the image forming apparatus in which the newly shipped toner cartridge is to be mounted. In this way, this configuration can reduce the potential for a user mistakenly mounting the newly shipped toner cartridge in an image forming apparatus other than the image forming apparatus 1 in which the new toner cartridge is to be mounted.

According to another aspect, the present disclosure also provides an information processing device is configured to control a plurality of image forming apparatuses which is enrolled in a service agreement. The information processing device comprising a memory and a controller. The memory is configured to store database in which identification information is associated with specific information. The identification information identifies the each of the plurality of image forming apparatuses. The specific information specifies the each of the plurality of image forming apparatuses. The controller is configured to perform determining whether a cartridge mounted in a specified image forming apparatus of the plurality of image forming apparatuses needs replacing. The cartridge is capable of using in each of the plurality of image forming apparatuses. The controller is configured to further perform specifying the specific information assigned to the specified apparatus, in a case where, in the determining, the cartridge mounted in the specified image forming apparatus should need replacing. The specific information is associated with the identification information identifying the specified image forming apparatus. The controller is configured to further perform transmitting the specific information of the specified image forming apparatus to an output device configured to output a label indicating the specific information.

According to the above configuration, owing to the output device outputting a label indicating the location information, a shipping operator constituting the shipper of the toner cartridge can affix the label on a packing box to specify the image forming apparatus in which the newly shipped toner cartridge is to be mounted. Accordingly, the user that is the recipient of the newly shipped toner cartridge can specify the image forming apparatus in which the new toner cartridge is to be mounted by viewing the label affixed to the packing box. Therefore, potential for the user mounting the new toner cartridge in the wrong device can be reduced.

BRIEF DESCRIPTION OF THE DRAWINGS

The particular features and advantages of the disclosure will become apparent from the following description taken in connection with the accompanying drawings, in which:

FIG. 8A is a view showing an example of a conventional settings screen; and

FIG. 8B is a view showing an example of a settings screen according to the present disclosure.

DETAILED DESCRIPTION

Configuration of an Image Formation System

Figure 1:
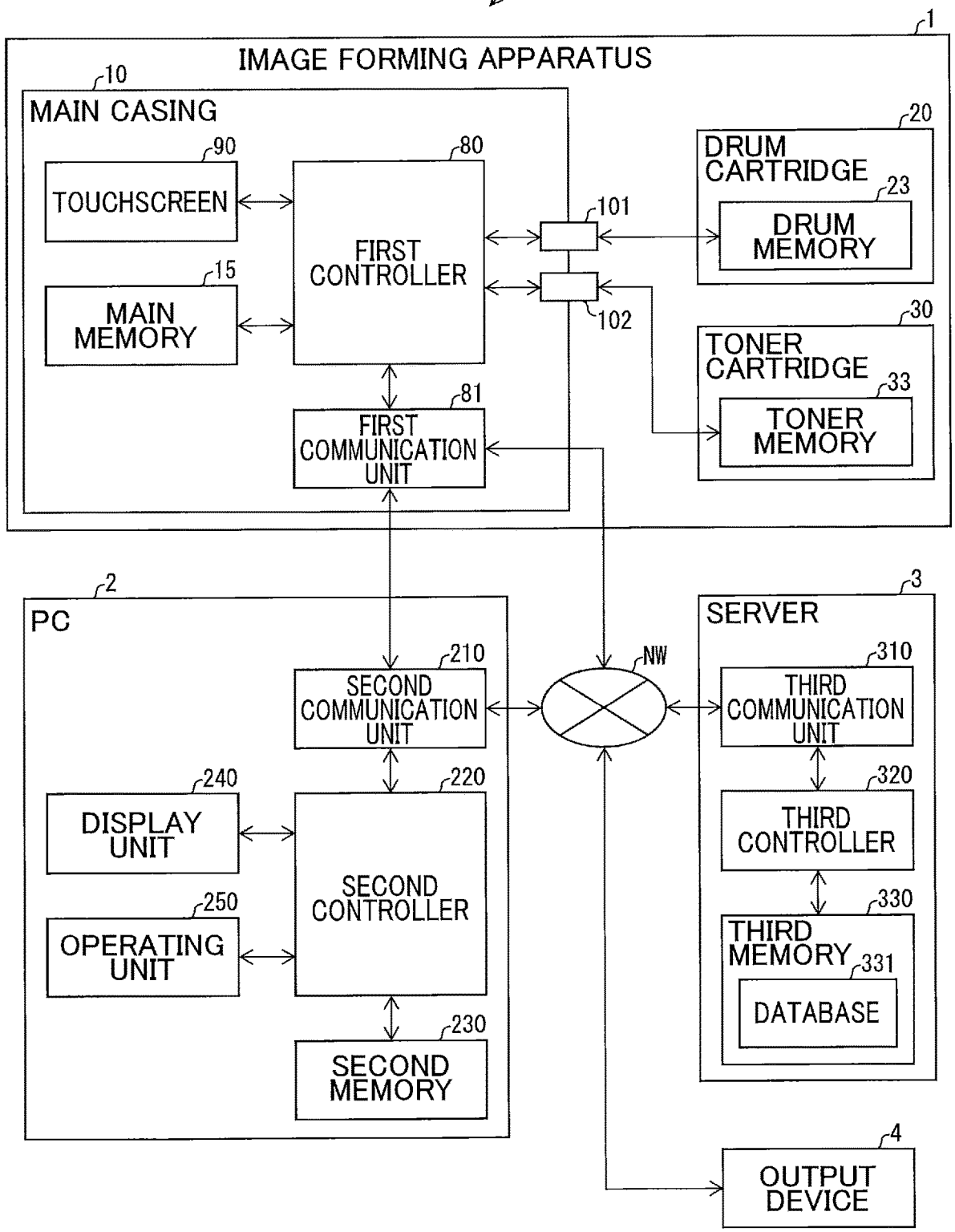
FIG. 1 is a block diagram showing a sample configuration of an image formation system.

FIG. 1 is a block diagram showing a sample configuration of an image formation system 100. As shown in FIG. 1, the image formation system 100 includes an image forming apparatus 1, a personal computer (PC) 2, a server 3, and an output device 4. The image forming apparatus 1 is connected to and capable of communicating with the PC 2. The image forming apparatus 1 and PC 2 can both communicate with the server 3 over a network NW. A smartphone or other portable information device may be used in place of the PC 2. The server 3 is connected to and capable of communicating with the output device 4 installed in a warehouse over the network NW.

The output device 4 outputs a label to be attached to a new cartridge being shipped, described below, or to the box in which the new cartridge being shipped is packed. The new cartridge being shipped is a cartridge to be shipped from a warehouse to the user that owns an image forming apparatus 1 covered under a service agreement when a cartridge mounted in the image forming apparatus 1 needs replacing. The new cartridge being shipped is to be mounted in the new image forming apparatus 1 to replace the cartridge that needs replacing. The output device 4 is a printing device that prints the following shipping destination information on a label, for example. The shipping destination information indicates the destination to which a new cartridge is to be shipped. For example, the shipping destination information indicates the name and address of the user as the destination for shipping the new cartridge. Examples of the output device 4 are an electrophotographic printer, an inkjet printer, or a printer using a tape cassette as the cartridge for supplying tape as the printing base material. In the following description, the box for packing the new cartridge being shipped will be called a packing box.

Overview of the Image Forming Apparatus

Figure 2:
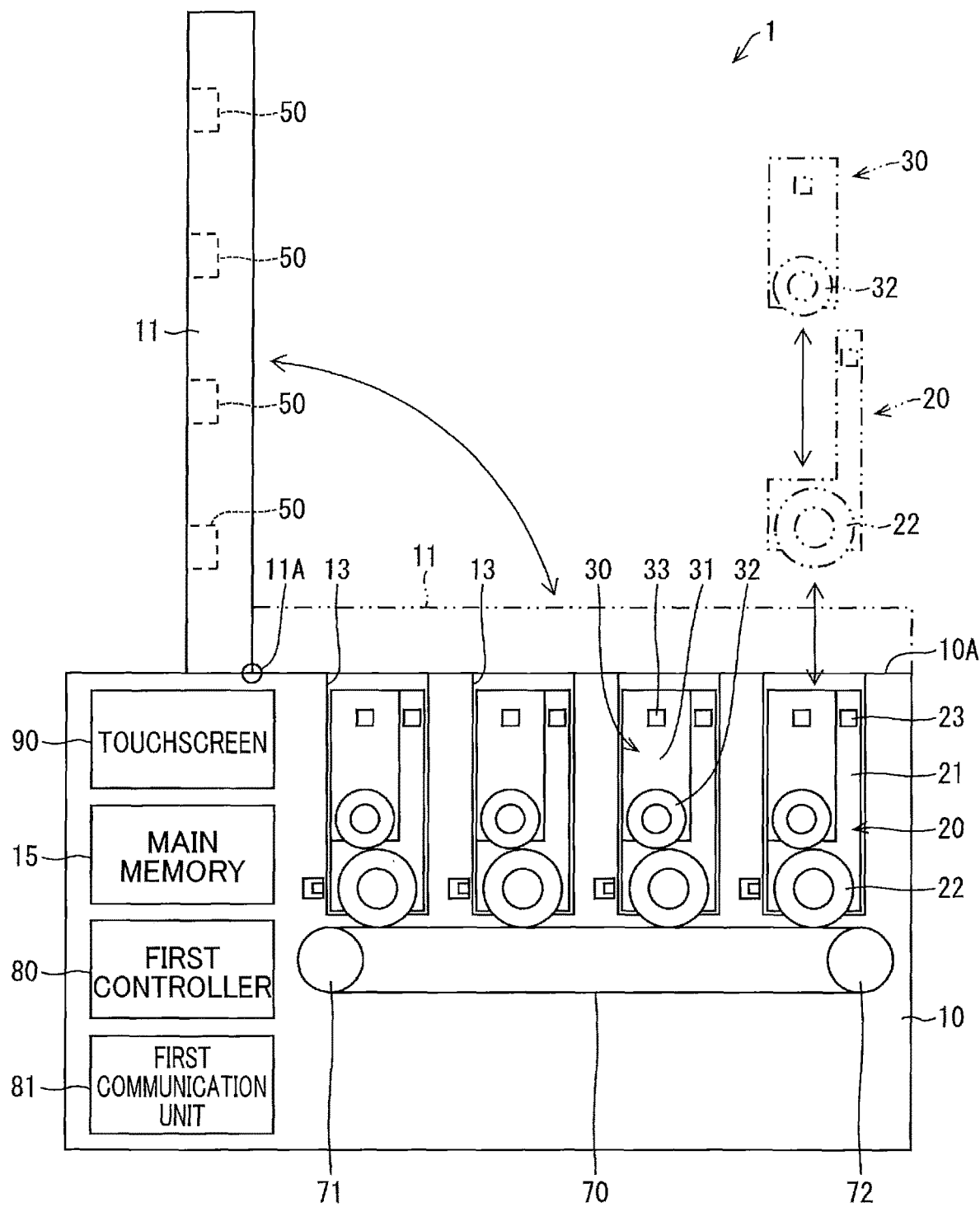
FIG. 2 is a schematic diagram showing a sample structure of an image forming apparatus.

FIG. 2 is a schematic diagram showing a sample structure of the image forming apparatus 1. The image forming apparatus 1 is an electrophotographic printer. One example of the electrophotographic image forming apparatus 1 is a light-emitting diode (LED) printer, but a laser printer is another example of an electrophotographic printer.

As shown in FIG. 2, the image forming apparatus 1 includes a main casing 10, a cover 11, a transfer belt 70, and a first controller 80. Drum cartridges 20 and toner cartridges 30, both serving as examples of the cartridges, are also mounted in the image forming apparatus 1.

Four each of the drum cartridges 20 and toner cartridges 30 must be mounted in the image forming apparatus 1 of the present embodiment in order to perform image formation. However, there is no limitation on the numbers of drum cartridges 20 and toner cartridges 30 mounted in an image forming apparatus of the present disclosure.

The image forming apparatus 1 includes a light source unit 50 for each of the drum cartridges 20. That is, the image forming apparatus 1 includes four light source units 50. Each toner cartridge 30 is mounted in and integrated with a drum cartridge 20. That is, in the case where the toner cartridge 30 is mounted in the drum cartridge 20, the toner cartridge 30 is mounted together with the drum cartridge 20 into the main casing 10.

The main casing 10 has a rectangular box shape, for example. The four drum cartridges 20, four toner cartridges 30, transfer belt 70, and first controller 80 are accommodated in the main casing 10. The main casing 10 has four cartridge retaining units 13. The cartridge retaining units 13 are formed as recesses having openings. The drum cartridges 20 and toner cartridges 30 are retained in corresponding cartridge retaining units 13 when the drum cartridges 20 and the toner cartridges 30 are mounted in the main casing 10.

A touchscreen 90 is provided on the outer surface of the main casing 10. In place of the touchscreen 90, the main casing 10 may separately include a display unit that includes a liquid crystal display, lamps, etc.; and an operating unit that includes buttons and the like.

An opening 10A is formed in the top of the main casing 10. The cover 11 opens and closes the opening 10A. The cover 11 can rotate (move) about a rotational shaft 11A extending along a first direction between an open position depicted with solid lines in FIG. 2 for exposing the opening 10A, and a closed position depicted with two-dot chain lines in FIG. 2 for closing the opening 10A. Note that the "first direction" denotes a direction extending along the rotational axis of a developing roller (the developing roller axis) in a toner cartridge. The openings of the cartridge retaining units 13 are exposed when the cover 11 is in the open position and are covered by the cover 11 when the cover 11 is in the closed position.

A cover sensor (not shown) is provided in the opening 10A of the main casing 10. The cover sensor detects that the cover 11 is in the closed position. The cover sensor may be a contact-type sensor or an optical sensor, for example.

Drum Cartridges

Each drum cartridge 20 has a cartridge case 21 that is mountable in the main casing 10. The cartridge case 21 includes a photosensitive drum 22 as a part used in image formation. The photosensitive drum 22 is a replacement part. As the photosensitive drum 22 is used, the surface of the photosensitive drum 22 wears or otherwise degrades, requiring the photosensitive drum 22 to be replaced. The photosensitive drum 22 is a cylindrical photosensitive member extending in the first direction. The photosensitive drum 22 can rotate about a drum roller shaft extending in the first direction. The outer circumferential surface of the photosensitive drum 22 is covered by photosensitive material.

The drum cartridge 20 also has a drum memory 23. The drum memory 23 allows the reading and writing of information. The drum memory 23 is flash read-only memory (flash ROM) or electrically erasable programmable read-only memory (EEPROM; "EEPROM" is a registered Japanese trademark of Renesas Electronics Corporation), for example. The drum memory 23 stores a drum ID, drum life information, and drum identification information as information related to the photosensitive drum 22 of the drum cartridge 20.

The drum ID is a unique serial number for identifying an individual drum cartridge 20. The drum life information is at least one of a cumulative number of rotations of the photosensitive drum 22 and a cumulative number of pages printed using the photosensitive drum 22, for example. The drum identification information indicates whether the drum cartridge 20 is a subscription cartridge or a normal cartridge. Subscription cartridges can be used under a subscription condition, i.e., when a service agreement is entered for the image forming apparatus 1, but cannot be used under a normal condition, i.e., when a service agreement is not entered for the image forming apparatus 1. Normal cartridges can be used both on image forming apparatuses 1 under a subscription condition and image forming apparatuses 1 under a normal condition. The normal cartridges are commercially available, but subscription cartridges are not. Subscription cartridges are provided through a subscription.

A subscription service automatically ships drum cartridges 20 and toner cartridges 30 to the user based on the life information stored in a main memory 15 and enables the user can use subscription cartridges.

In addition to the drum ID, drum life information, and drum identification information, the drum memory 23 may store the following information. The drum memory 23 may also store a printer fleet ID set commonly for a plurality of image forming apparatuses 1 owned by the user and enrolled in a service agreement. The printer fleet ID identifies the plurality of image forming apparatuses 1 as a single printer fleet. Additionally, the drum memory 23 may store such information as the compatible models of image forming apparatuses 1 for the drum cartridge 20, specifications of the drum cartridge 20, information indicating whether the drum cartridge 20 is a genuine product, the error history of the drum cartridge 20, and the like.

Toner Cartridges

Each toner cartridge 30 has a cartridge case 31 that can accommodate a developing roller 32, and developer such as toner as an example of the printing material. The cartridge case 31 is mountable in the main casing 10. The four toner cartridges 30 accommodate developer in mutually different colors (for example, the colors cyan, magenta, yellow, and black) as the material used for forming images. The developer is a consumable that becomes depleted during use. The developing roller 32 is a cylindrical member that extends along the first direction and is rotatable about a developing roller shaft extending in the first direction. When the toner cartridge 30 is mounted in the drum cartridge 20, the outer circumferential surface of the photosensitive drum 22 contacts the outer circumferential surface of the developing roller 32.

The toner cartridge 30 also has a toner memory 33. The toner memory 33 is disposed on the outer surface of the toner cartridge 30 on one end in the first direction. The toner memory 33 allows the reading and writing of information. The toner memory 33 is flash ROM or EEPROM (registered trademark), for example.

The toner memory 33 stores a toner ID, toner life information, and toner identification information as information related to the toner cartridge 30. The toner memory 33 also stores the printer fleet ID described above.

The toner ID is a unique serial number for identifying an individual toner cartridge 30, for example. The toner life information specifies the remaining life of the developing roller 32. The toner life information is at least one of the cumulative number of rotations of the developing roller 32, the cumulative number of pages printed with the developing roller 32, and the cumulative number of dots formed with the developing roller 32, for example. The toner identification information specifies whether the toner cartridge 30 is a subscription cartridge or a normal cartridge.

Mounting of Cartridges and the Printing Mechanism

As shown in FIG. 2, the drum cartridges 20 and toner cartridges 30 are mounted in the main casing 10, in the case where the cover 11 is in the open position. In this state, the drum cartridges 20 and toner cartridges 30 are inserted into the cartridge retaining units 13 through the opening 10A.

The main casing 10 has connectors 101 and 102. In the case where the drum cartridge 20 is inserted into the cartridge retaining unit 13, the connector 101 is electrically connected to the drum memory 23, enabling the first controller 80 in the main casing 10 to communicate with the drum memory 23. In the case where the toner cartridge 30 is mounted in the main casing 10, the connector 102 is electrically connected to the toner memory 33 of the toner cartridge 30, enabling the first controller 80 to communicate with the toner memory 33.

The four light source units 50 are mounted on the inner surface of the cover 11. The light source units 50 are arranged to confront the top surfaces of the photosensitive drums 22 when the drum cartridges 20 are mounted in the main casing 10 and the cover 11 is in the closed position.

Each light source unit 50 is electrically connected to the first controller 80. The first controller 80 controls a plurality of light sources in the light source units 50 to emit light based on inputted image data. In this way, the light sources irradiate light toward the outer circumferential surfaces of the photosensitive drums 22. As a result, the photosensitive material on the outer circumferential surfaces of the photosensitive drums 22 is exposed according to the image data.

The transfer belt 70 is a part that transfers developer (e.g., toner) present on the surfaces of the photosensitive drums 22 onto printing paper. The transfer belt 70 is a replacement part. As the transfer belt 70 is used, the surface of the transfer belt 70 becomes worn or otherwise degrades, requiring the transfer belt 70 to be replaced. The transfer belt 70 is a belt having an annular shape (an endless belt) that can contact the photosensitive drums 22. The outer circumferential surfaces of the photosensitive drums 22 can contact the outer surface of the transfer belt 70. During a printing process, printing paper is conveyed between the transfer belt 70 and the photosensitive drums 22.

The transfer belt 70 is stretched around a drive roller 71, and a follow roller 72. The drive roller 71 drives the transfer belt 70. The first controller 80 rotates the drive roller 71. The follow roller 72 rotates along with the movement of the transfer belt 70 associated with the drive of the drive roller 71.

Internal Structure of the Main Casing

The first controller 80 has an application-specific integrated circuit (ASIC), for example. The first controller 80 is electrically connected to the main memory 15, a first communication unit 81, and the touchscreen 90 provided in the main casing 10. The first controller 80 executes various processes for controlling the image forming apparatus 1 to perform a printing process and its related processes.

The first controller 80 may also include a processor, such as a central processing unit (CPU). In this case, a control program for implementing an image formation control method may be stored in the main memory 15. The first controller 80 may control the image forming apparatus 1 to execute a printing process by the processor of the first controller 80 performing operations according to the control program.

The first controller 80 may also include a computer-readable storage medium that stores the control program. The storage medium may be a "non-transitory, tangible medium," such as read-only memory (ROM), a tape, a disc, a card, semiconductor memory, or a programmable logic circuit. Random-access memory (RAM) or the like may be used for developing the control program. The control program may also be supplied to the computer via any transmission medium (a communication network, broadcast waves, etc.) capable of transmitting the control program. Note that one aspect of this disclosure is that the control program can be implemented in the form of data signals embedded in a carrier wave, as embodied in electronic transmission.

When the drum cartridge 20 and toner cartridge 30 are mounted in the corresponding cartridge retaining unit 13 of the main casing 10, the drum memory 23 and toner memory 33 are electrically connected to the first controller 80, as illustrated in FIG. 1. Through these connections, the first controller 80 can execute a read process for reading information from the drum memory 23 and toner memory 33, and a write process for writing information to the drum memory 23 and toner memory 33.

The main memory 15 allows the reading and writing of information. The main memory 15 is flash ROM or EEPROM (registered trademark), for example. The main memory 15 stores registration information and life information.

The registration information includes the drum IDs read from the drum memories 23, and the toner IDs read from the toner memories 33. The life information includes drum life information and toner life information. The drum life information is identical to the drum life information stored in the drum memories 23, e.g., at least one of the cumulative number of rotations of each photosensitive drum 22 and the cumulative number of pages printed using each photosensitive drum 22. The toner life information is identical to the toner life information stored in the toner memories 33, e.g., at least one of the cumulative number of rotations of each developing roller 32, the cumulative number of pages printed using each developing roller 32, and the cumulative number of dots formed using each developing roller 32.

The main memory 15 also stores a printer ID. The printer ID is an example of identification information for identifying the image forming apparatus 1. The printer ID is the serial number of the image forming apparatus 1, for example. The main memory 15 also stores the printer fleet ID described above. Additionally, the main memory 15 stores the following location information and model name information. The location information specifies the installation site of the image forming apparatus 1 and is an example of the specific information for specifying each of the plurality of image forming apparatuses 1. The model name information specifies the model name of the image forming apparatus 1. For example, model name information may be the model number of the image forming apparatus 1.

The main memory 15 also stores mode information. The mode information specifies whether the image forming apparatus 1 is set to the subscription mode, i.e., is under a subscription condition, or is set to the normal mode, i.e., is under a normal condition. In other words, the mode information indicates whether the first controller 80 will execute control under a subscription condition or a normal condition.

The mode information indicates the subscription mode when a service agreement is entered for the image forming apparatus 1. When the mode information specifies the subscription mode, the first controller 80 determines whether drum identification information stored in the drum memory 23 of each mounted drum cartridge 20 indicates that the drum cartridge 20 is a subscription cartridge. The first controller 80 also determines whether the printer fleet ID stored in the drum memory 23 of the mounted drum cartridge 20 matches the printer fleet ID stored in the main memory 15. The first controller 80 allows use of the mounted drum cartridge 20 when determining that drum identification information indicating that the drum cartridge 20 is a subscription cartridge is stored in the drum memory 23 and the printer fleet ID in the drum memory 23 matches the printer fleet ID in the main memory 15.

Further, when the mode information specifies the subscription mode, the first controller 80 determines whether toner identification information stored in the toner memory 33 of each mounted toner cartridge 30 indicates that the toner cartridge 30 is a subscription cartridge. The first controller 80 also determines whether the printer fleet ID stored in the mounted toner memory 33 matches the printer fleet ID stored in the main memory 15. The first controller 80 allows use of the mounted toner cartridge 30 when determining that toner identification information indicating that the toner cartridge 30 is a subscription cartridge is stored in the toner memory 33 and the printer fleet ID in the toner memory 33 matches the printer fleet ID in the main memory 15.

Hence, drum cartridges 20 and toner cartridges 30 that are subscription cartridges can be used on a plurality of image forming apparatuses 1 having mode information specifying the subscription mode and matching printer fleet IDs. In the description of the present embodiment, the drum cartridges 20 and toner cartridges 30 are subscription cartridges, a service agreement is entered for the image forming apparatus 1, and the mode information specifies the subscription mode.

The first communication unit 81 is a communication interface that enables communication between the image forming apparatus 1 and the PC 2. The first controller 80 can receive print jobs from the PC 2 via the first communication unit 81. A print job is a print command that the first controller 80 receives from an external device such as the PC 2. The first communication unit 81 is also a communication interface that enables communication with the server 3 via the network NW.

Structure of the PC

As shown in FIG. 1, the PC 2 is an information processing device that can communicate with each of a plurality of image forming apparatuses 1. The PC 2 is an example of the second information processing device. The PC 2 includes a second communication unit 210, a second controller 220, a second memory 230, a display unit 240, and an operating unit 250.

The second controller 220 has an ASIC, for example. The second controller 220 is electrically connected to the second memory 230. By executing various processes, the second controller 220 controls the PC 2 to perform various processes. As with the first controller 80, the second controller 220 may include a processor such as a CPU, and a computer-readable storage medium that stores a control program.

The second memory 230 allows the reading and writing of information. The second memory 230 is flash ROM or EEPROM (registered trademark), for example. The second memory 230 stores a printer ID for each image forming apparatus 1, and the location information and model name information of the image forming apparatus 1 in association with each printer ID, for example.

In addition, the second communication unit 210 is a communication interface that enables communication between the image forming apparatus 1 and PC 2 and communication between the server 3 and PC 2. The display unit 240 displays various information. For example, the display unit 240 displays location information indicating the installation site of the image forming apparatus 1, and model name information indicating the model name of the image forming apparatus 1. The operating unit 250 receives various user commands. For example, the operating unit 250 receives location information set for the image forming apparatus 1. The operating unit 250 is a keyboard, for example. The display unit 240 and operating unit 250 may be implemented as an integrated device, such as a touchscreen.

Structure of the Server

As shown in FIG. 1, the server 3 is an information processing device that controls each of the image forming apparatuses 1. The server 3 is an example of the first information processing device. The server 3 is a management device that manages the operating status of image forming apparatuses 1. The server 3 includes a third communication unit 310, a third controller 320, and a third memory 330.

The third communication unit 310 is connected to the image forming apparatus 1, PC 2, or output device 4 via the network NW.

The third controller 320 has an ASIC, for example. The third controller 320 is electrically connected to the third memory 330. The third controller 320 is an example of the user controller. By executing various processes, the third controller 320 controls the server 3 to perform various processes. As with the first controller 80, the third controller 320 may include a processor such as a CPU, or a computer-readable storage medium that stores a control program.

The third memory 330 allows the reading and writing of information. The third memory 330 is flash ROM or EEPROM (registered trademark), for example. The third memory 330 stores a database 331 that associates the printer ID of each image forming apparatus 1 with location information specifying the image forming apparatus 1, for example. The database 331 stores a user ID as an example of the user information, a printer fleet ID associated with the user ID, and a plurality of printer IDs associated with the printer fleet ID, for example. The database 331 also stores the location information, model name information, registration information, and life information associated with each printer ID. Additionally, the third memory 330 may include shipping destination information associated with user IDs, the date of manufacture of the image forming apparatuses 1, and information specifying whether the image forming apparatuses 1 are enrolled in a service agreement.

The third controller 320 executes a determination process to determine whether a toner cartridge 30 mounted in one of the plurality of image forming apparatuses 1 needs to be replaced, for example. Specifically, when a shipping request and a printer ID for a toner cartridge 30 is received from an image forming apparatus 1, the third controller 320 specifies registration information in the database 331 associated with a printer ID matching the received printer ID. Since the registration information includes a toner ID as described above, the third controller 320 can specify the toner ID associated with the received printer ID. Through this identification, the third controller 320 can determine which of the plurality of image forming apparatuses 1 has a mounted toner cartridge 30 that needs replacing.

For the toner cartridge 30 that the third controller 320 determines to need replacing in the determination process described above, the third controller 320 executes an identification process to specify the location information in the database 331 associated with the printer ID of the image forming apparatus 1 in which the toner cartridge 30 is mounted. Specifically, the third controller 320 may be configured to perform specifying a piece of the location information in the database 331 associated with a piece of the printer ID of the image forming apparatus 1 in which the toner cartridge 30 is mounted. The third controller 320 executes a transmission process to transmit the location information specified in the identification process to the output device 4. Specifically, the third controller 320 may be configured to perform transmitting the piece of the location information specified in the identification process to the output device 4.

In the present embodiment, the server 3 references the database 331 to specify the location information for the image forming apparatus 1 in which the new toner cartridge 30 being shipped needs to be mounted and transmits the specified location information to the output device 4. Accordingly, the output device 4 can output a label 300 that indicates both the shipping destination information for the new toner cartridge 30 being shipped, and the location information for the image forming apparatus 1 in which the new toner cartridge 30 is to be mounted.

Figure 3:
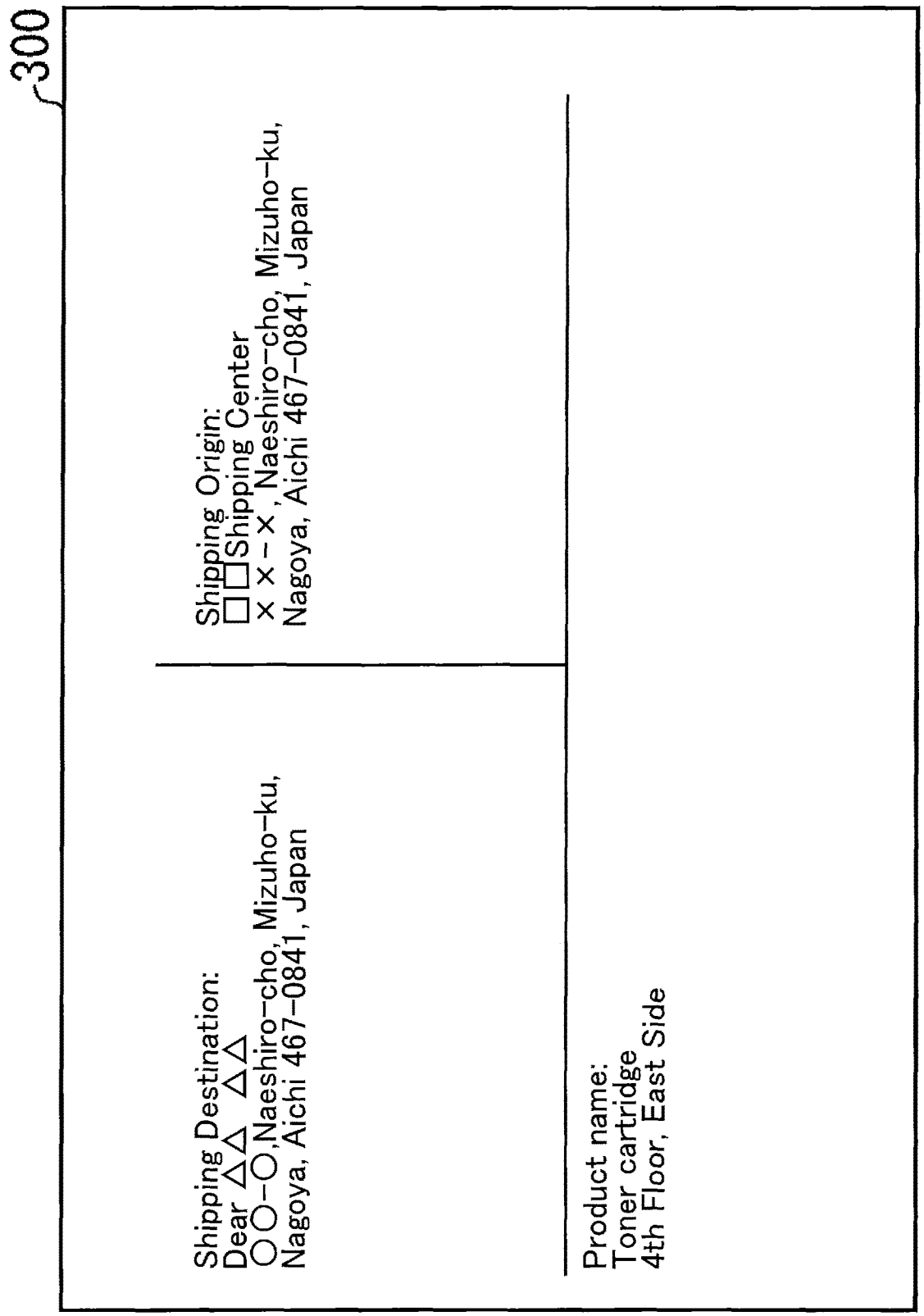
FIG. 3 is a view showing an example of a label.

FIG. 3 shows an example of the label 300. In the example of FIG. 3, the name and address for the shipping destination is printed on the label 300 as shipping destination information indicating the shipping destination for the new toner cartridge 30, and "toner cartridge" is printed on the label 300 as product name information specifying the name of the product being shipped to the destination. Also in the example of FIG. 3, "$4^{th}$ Floor, East Side" is printed on the label 300 as the location information specifying the installation site of the image forming apparatus 1 in which the newly shipped toner cartridge 30 is to be mounted. As shown in FIG. 3, the name and address of the shipper, for example, may also be printed on the label 300 as shipper information specifying the shipping origin of the new toner cartridge 30.

Owing to the output device 4 outputting the label 300, a shipping operator constituting the shipper of the toner cartridge 30 can affix the label 300 on a packing box to specify the image forming apparatus 1 in which the newly shipped toner cartridge 30 is to be mounted. Accordingly, the user that is the recipient of the newly shipped toner cartridge 30 can specify the image forming apparatus 1 in which the new toner cartridge 30 is to be mounted by viewing the label 300 affixed to the packing box. Therefore, potential for the user mounting the new toner cartridge 30 in the wrong device can be reduced.

Further, owing to the output device 4 outputting a label 300 indicating the location information, the user viewing the label 300 can distinguish the image forming apparatus 1 from its installation site. Note that the identification information printed on the label 300 is not limited to location information but may be any information capable of differentiating the image forming apparatus 1 in which the newly shipped toner cartridge 30 is to be mounted from other image forming apparatuses 1.

The label 300 may be directly affixed to the toner cartridge 30 rather than the packing box. Further, while a case for replacing toner cartridges 30 is described in the present embodiment, a case for replacing drum cartridges 20 may similarly be described.

Additionally, when a service agreement is entered with a new image forming apparatus 1, the third controller 320 executes a process for registering location information for the new image forming apparatus 1 in the database 331 in association with the printer ID identifying the new image forming apparatus 1. Through the process described above, the third controller 320 can specify location information for an image forming apparatus 1 in which the newly shipped toner cartridge 30 is to be mounted, including a new image forming apparatus 1 that is enrolled in a service agreement. Hence, the output device 4 can output a label 300 specifying the image forming apparatus 1 in which the new toner cartridge 30 being shipped is to be mounted, including a new image forming apparatus 1.

The third controller 320 also executes a process to receive location information for a new image forming apparatus 1 and executes a process to register the received location information in the database 331 in association with the printer ID for the new image forming apparatus 1. Through this process, location information for a new image forming apparatus 1 can be recorded in the database 331, even if location information was not set for the new image forming apparatus 1 prior to the service agreement being concluded. In other words, location information for all image forming apparatuses 1 covered under a service agreement can be registered in the database 331.

Below, an example will be described for a method implemented on the image formation system 100. This method enables identification of the image forming apparatus 1 in which a newly shipped toner cartridge 30 is to be mounted.

Process for Entering a Service Agreement for a New Image Forming Apparatus

Figure 4:
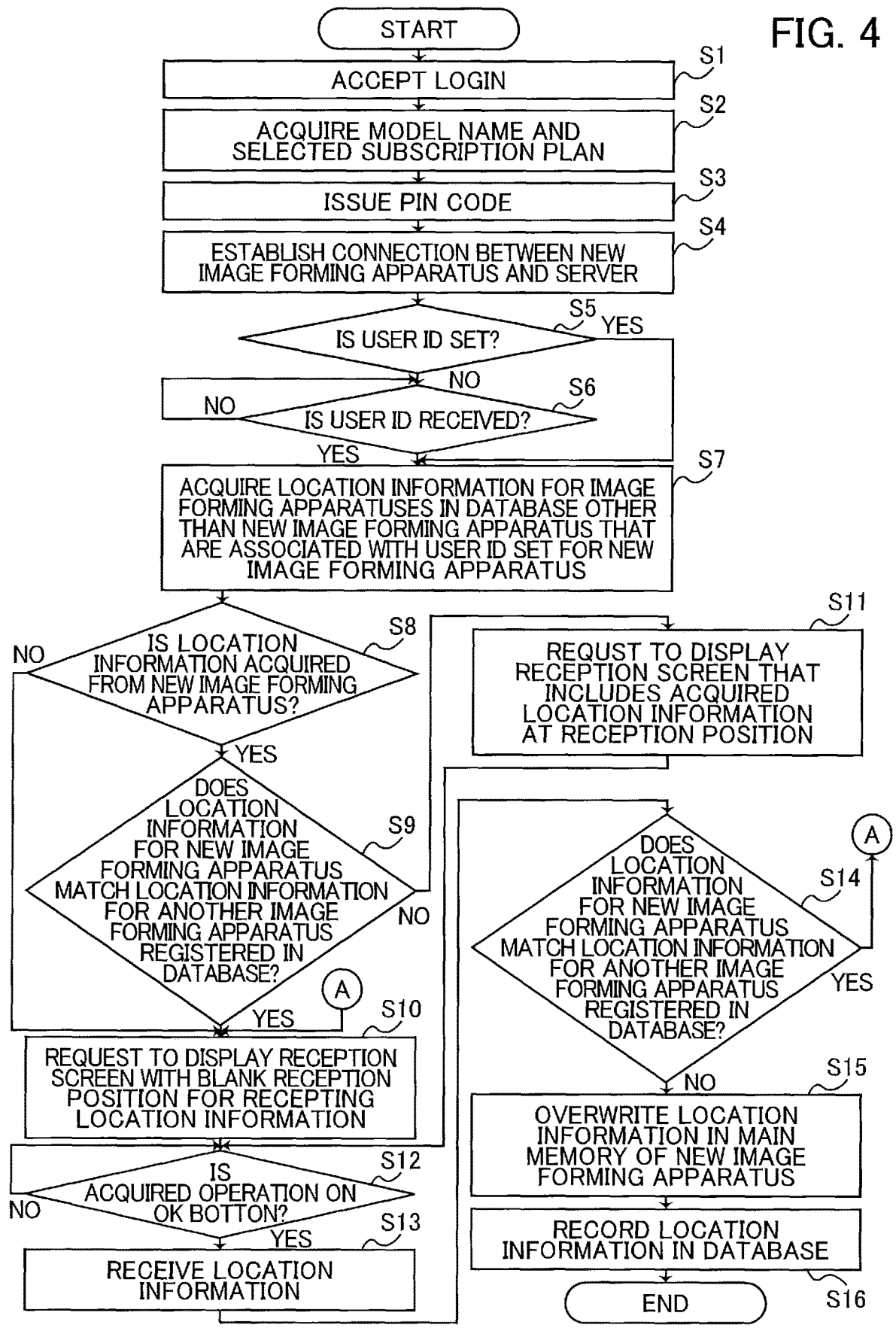
FIG. 4 is a flowchart showing a sample process performed by a server when a service agreement is entered for a new image forming apparatus.

FIG. 4 is a flowchart showing a sample process performed by the server 3 when a service agreement is entered for a new image forming apparatus 1. In the description of the present embodiment, the process of FIG. 4 is executed by the server 3, but this process may be executed by an information processing device other than the server 3.

As shown in FIG. 4, in S1 the third controller 320 accepts a login into the server 3. Specifically, the third controller 320 acquires a login ID and password from the PC 2 inputted via the operating unit 250. When authentication of the login ID and password is successful, in S2 the third controller 320 transmits to the PC 2 a request to select the model name of the new image forming apparatus 1 being entered into a service agreement, and a request to select a subscription plan in which the new image forming apparatus 1 will be subscribed. After transmitting these requests, the third controller 320 acquires from the PC 2 the model name and subscription plan for the new image forming apparatus 1 selected via the operating unit 250.

In S3 the third controller 320 issues a personal identification number (PIN) code for the new image forming apparatus 1 and transmits the PIN code to the PC 2. The second controller 220 of the PC 2 displays the acquired PIN code on the display unit 240. The first controller 80 of the new image forming apparatus 1 accepts a user inputted PIN code via the touchscreen 90. When the third controller 320 acquires a notification from the new image forming apparatus 1 via the PC 2 indicating that the new image forming apparatus 1 received the PIN code, in S4 the third controller 320 establishes a connection between the new image forming apparatus 1 and the server 3.

In S5 the third controller 320 references the database 331 to determine whether a user ID was set for the new image forming apparatus 1. A user ID having been set for the new image forming apparatus 1 signifies that a user ID was issued for the new image forming apparatus 1 and is stored in the database 331 in association with the printer ID of the new image forming apparatus 1.

In a case where the third controller 320 determines that a user ID is set for the new image forming apparatus 1 (S5: YES), in S7 the third controller 320 acquires location information for image forming apparatuses 1 from the database 331. Specifically, the third controller 320 acquires location information for image forming apparatuses 1 in the database 331 other than the new image forming apparatus 1 that are associated with the user ID set for the new image forming apparatus 1.

On the other hand, if the third controller 320 determines that a user ID is not set for the new image forming apparatus 1 (S5: NO), in S6 the third controller 320 determines whether a user ID set for the new image forming apparatus 1 was received. Specifically, the third controller 320 transmits a request to the PC 2 to acquire the user ID. The second controller 220 displays a screen on the display unit 240 to accept a user ID. When a user ID is inputted via the operating unit 250, the second controller 220 transmits the inputted user ID to the server 3. In this way, the third controller 320 determines that the user ID was received when the user ID is acquired from the PC 2.

If the third controller 320 determines that a user ID set for the new image forming apparatus 1 was received (S6: YES), the third controller 320 executes the process in S7. The third controller 320 continues to execute the process in S6 until a user ID for the new image forming apparatus 1 is received (S6: NO).

In S8 the third controller 320 determines whether location information could be acquired from the new image forming apparatus 1. Specifically, the third controller 320 transmits a request to the new image forming apparatus 1 requesting the transmission of location information set for the image forming apparatus 1. The first controller 80 of the new image forming apparatus 1 determines whether location information is stored in the main memory 15. When location information is stored in the main memory 15, the first controller 80 transmits the location information to the server 3. In this way, the third controller 320 determines that location information could be acquired from the new image forming apparatus 1. However, if location information is not stored in the main memory 15, the first controller 80 transmits a notification to the server 3 specifying that location information is not stored. In this way, the third controller 320 determines that location information could not be acquired from the new image forming apparatus 1. Note that the location information set for the image forming apparatus 1 may be stored in a storage device other than the main memory 15 with which the image forming apparatus 1 can communicate.

If the third controller 320 determines that location information could be acquired from the new image forming apparatus 1 (S8: YES), the third communication unit 310 executes the following process. That is, in S9 the third controller 320 executes a determination process to determine whether the location information acquired in S8 for the new image forming apparatus 1 matches the location information acquired in S7 for another image forming apparatus registered in the database 331. Specifically, the third controller 320 may be configured to determining whether a piece of the location information acquired in S8 for the new image forming apparatus 1 matches another piece of the location information acquired in S7 for another image forming apparatus registered in the database 331. The determination process of S9 is an example of the second determination step.

If the third controller 320 determines that the location information for the new image forming apparatus 1 matches the location information for another image forming apparatus registered in the database 331 (S9: YES), the third controller 320 executes the following process. That is, in S10 the third controller 320 executes a display process to display a reception screen 501 for accepting location information for the new image forming apparatus 1. The display process of S10 is an example of the display step. More specifically, the third controller 320 transmits a display request to the PC 2 to display the reception screen 501, whereby the second controller 220 displays the reception screen 501 on the display unit 240. FIG. 5 shows an example of the reception screen 501.

Figure 5A:
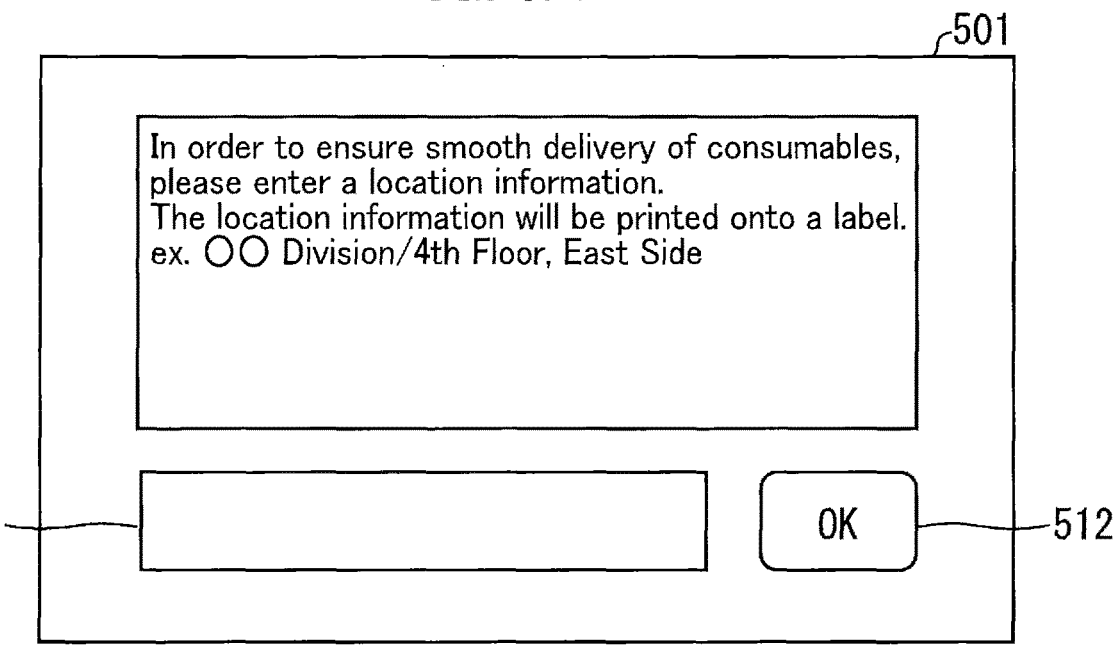
FIG. 5A is a view showing an example of a reception screen in which a location information is not displayed.

In S10 the third controller 320 issues a request to the second controller 220 not to display location information for the new image forming apparatus 1 in the reception screen 501. Through this request, the second controller 220 displays on the display unit 240 the reception screen 501 with a blank reception position 511 that can receive location information for the new image forming apparatus 1, as illustrated in FIG. 5(A).

If location information set for the new image forming apparatus 1 matches location information already registered in the database 331, registering the location information set for the new image forming apparatus 1 in the database 331 as is would result in the same location information being registered in the database 331 for two or more image forming apparatuses 1. Consequently, when receiving a toner cartridge with a label 300 indicating the same location information set for two or more image forming apparatuses 1, the user may not be able to specify which of the two or more image forming apparatuses 1 having the same location information is the image forming apparatus 1 in which the toner cartridge 30 should be mounted. Through the process of S10, the third controller 320 can receive different location information when location information is set for the new image forming apparatus 1 by not displaying the set location information. Hence, the third controller 320 can reduce the potential for identical location information being registered in the database 331. To receive location information, the third controller 320 may prompt the user to select one item of location information from a plurality of items provided in a pull-down menu, for example, thereby reducing the likelihood that inappropriate terms will be used as the location information.

The third controller 320 also executes the process in S10 when the third controller 320 unable to acquire location information from the new image forming apparatus 1 (S8: NO). In this way, the third controller 320 can prompt the user to set location information for the new image forming apparatus 1.

On the other hand, if the third controller 320 determines that the location information for the new image forming apparatus 1 does not match the location information for other image forming apparatuses registered in the database 331 (S9: NO), the third controller 320 executes the following process. Specifically, in S11 the third controller 320 executes a display process for displaying the reception screen 501. The display process of S11 is an example of the display step.

Figure 5B:
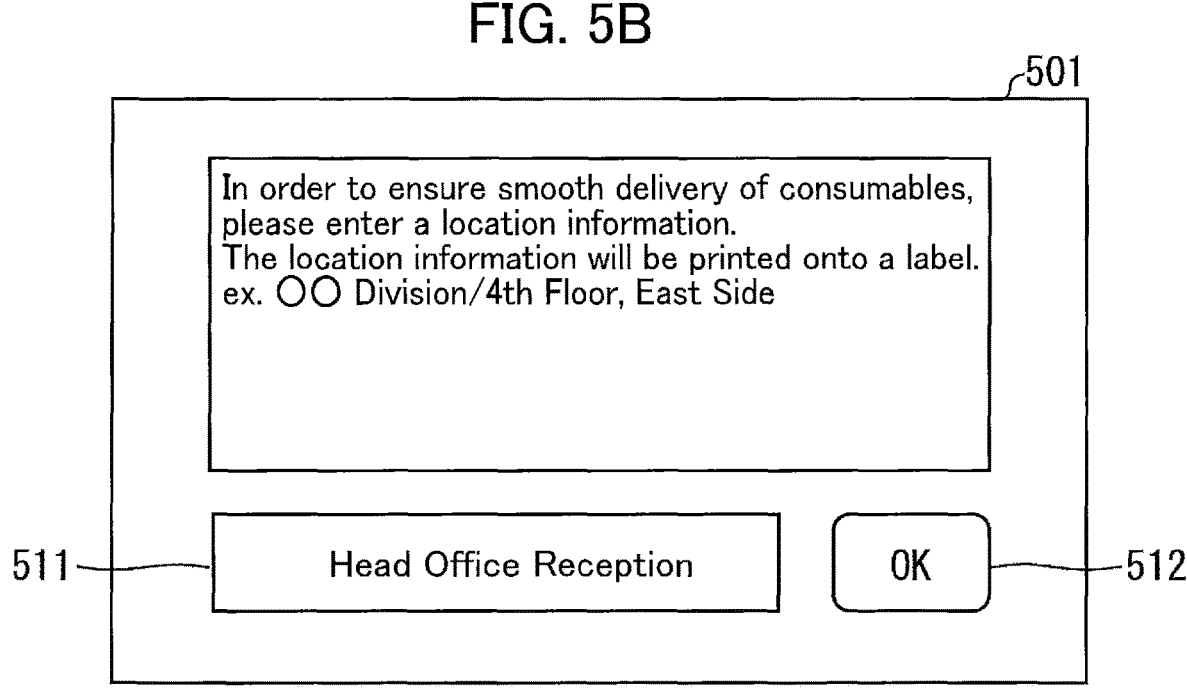
FIG. 5B is a view showing an example of a reception screen in which the location information is displayed.

In S11 the third controller 320 issues a request to the second controller 220 to display the location information for the new image forming apparatus 1 in the reception screen 501. Specifically, the third controller 320 may be configured to perform issuing a request to the second controller 220 the piece of the location information for the new image forming apparatus 1 in the reception screen 501. Through this request, the second controller 220 displays on the display unit 240 the reception screen 501 that includes the location information acquired in S9 at the reception position 511, as illustrated in FIG. 5(B).

When location information set for the new image forming apparatus 1 does not match location information registered in the database 331, the location information for the new image forming apparatus 1 will not duplicate other location information when registered in the database 331. Consequently, when receiving a toner cartridge 30 with a label 300 specifying the location information, the user can uniquely specify the image forming apparatus 1 in which the toner cartridge 30 is to be mounted. Through the process of S11, the third controller 320 can omit the step of receiving via the reception screen 501 location information for the new image forming apparatus 1 that does not duplicate location information already registered in the database 331. Hence, the third controller 320 does not place a burden on the user to input location information for the new image forming apparatus 1.

In S12 the third controller 320 determines whether an operation on an OK button 512 was acquired for confirming the location information displayed in the reception position 511. When an operation on the OK button 512 was acquired, the second controller 220 transmits a notification to the server 3 indicating that an operation on the OK button 512 was acquired. In this way, the third controller 320 determines when an operation on the OK button 512 was acquired.

When an operation on the OK button 512 was acquired (S12: YES), in S13 the third controller 320 executes a process to receive the location information displayed in S10 or S11 for the new image forming apparatus 1 from the PC 2. Specifically, the third controller 320 may be configured to perform receiving the piece of the location information displayed in S10 or S11 for the new image forming apparatus 1 from the PC2. The process of S13 is an example of the reception step. However, while having not received a notification indicating that an operation on the OK button 512 was acquired (S12: NO), the third controller 320 continues to execute the process of S12.

In S14 the third controller 320 executes a determination process to determine whether the location information for the new image forming apparatus 1 received in S13 matches the location information acquired in S7 for other image forming apparatuses registered in the database 331. The process of S14 is an example of the second determination step.

If the third controller 320 determines that location information for the new image forming apparatus 1 does not match location information for other image forming apparatuses registered in the database 331 (S14: NO), the third controller 320 executes the following process. In S15 the third controller 320 transmits the location information received in S13 to the new image forming apparatus 1 and requests the image forming apparatus 1 to store this location information in the main memory 15. The first controller 80 of the new image forming apparatus 1 stores the location information received from the server 3 in the main memory 15. If location information is already stored in the main memory 15, i.e., if location information is set for the new image forming apparatus 1, the first controller 80 overwrites the location information currently stored in the main memory 15 with the location information received from the server 3. Through this process, the third controller 320 can direct the new image forming apparatus 1 to store location information that was acquired while a service agreement was being entered for the new image forming apparatus 1.

On the other hand, if the third controller 320 determines that the location information for the new image forming apparatus 1 matches the location information for another image forming apparatus registered in the database 331 (S14: YES), the third controller 320 executes the process of S10. In this way, the third controller 320 can reduce the potential for identical location information being registered in the database 331.

In S16 the third controller 320 records the location information for the new image forming apparatus 1 received in S13 in the database 331 in association with the printer ID for the new image forming apparatus 1. Specifically, the third controller 320 may be configured to perform record the piece of the location information for the new image forming apparatus 1 received in S13 in the database 331 in association with the piece of the printer ID for the new image forming apparatus 1. The process of S16 is an example of the first registration step. Through this process, the third controller 320 can register location information for a new image forming apparatus 1 in the database 331 even when location information is not set for the new image forming apparatus 1.

Further, when the third controller 320 determines that location information for the new image forming apparatus 1 does not match location information for other image forming apparatuses 1 registered in the database 331, in S16 the third controller 320 registers location information for the new image forming apparatus 1 in the database 331. In this way, the third controller 320 can register location information for a new image forming apparatus 1 in the database 331 without duplicating location information already recorded in the database 331.

Note that the third controller 320 need not execute the process of S14. In this case, the third controller 320 registers the location information received in S13 in the database 331 as the location information for the new image forming apparatus 1. When executing the process in S14, the user is prompted to re-input location information for the new image forming apparatus 1, even though the user had deliberately set location information already registered in the database 331 for the new image forming apparatus 1. By omitting the process of S14, the third controller 320 does not place a burden on the user to re-input location information for the new image forming apparatus 1, even though there is potential for identical location information being registered in the database 331.

Further, while the reception screen 501 is displayed on the display unit 240 of the PC 2 in the above description, the reception screen 501 may be displayed on the touchscreen 90 of the image forming apparatus 1 instead. Further, the order of the processes in S15 and S16 is not important.

Preparations for Shipping a Toner Cartridge

Figure 6:
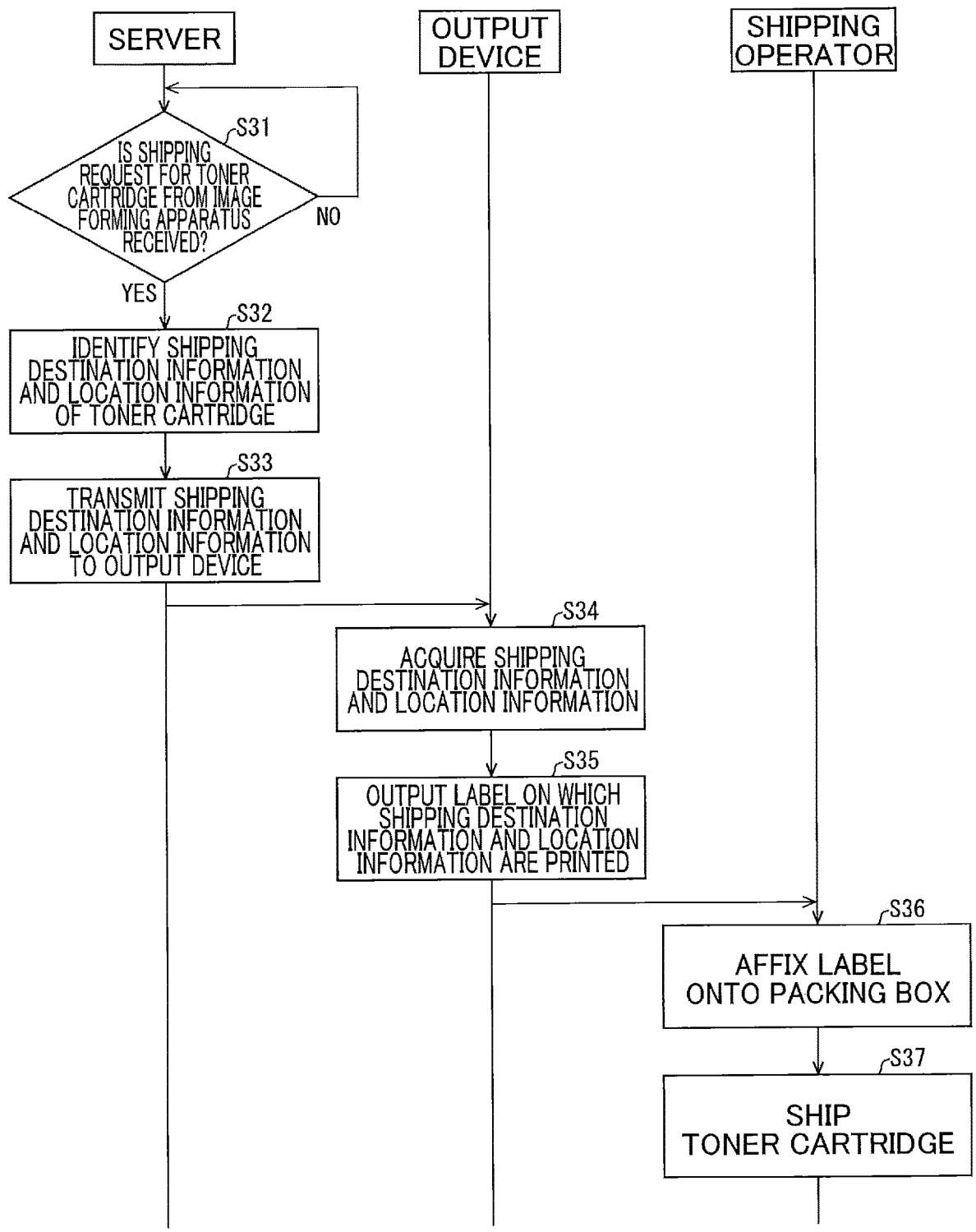
FIG. 6 is a view showing a sample process performed after the server receives a request to ship a new toner cartridge and continuing until a shipping operator ships a new toner cartridge to the user.

FIG. 6 shows a sample process performed after the server 3 receives a request to ship a toner cartridge 30 and continuing until the shipping operator ships the new toner cartridge 30 to the user.

As shown in FIG. 6, the third controller 320 of the server 3 executes a determination process in S31 to determine whether a toner cartridge 30 mounted in one of the plurality of image forming apparatuses 1 needs replacing. The determination process of S31 is an example of the first determination step. Specifically, the third controller 320 determines in S31 whether a request to ship a toner cartridge 30 was received from an image forming apparatus 1. The first controller 80 transmits a shipping request for a toner cartridge 30 mounted in the image forming apparatus 1 to the server 3 together with a printer ID when determining that the residual quantity of developer in the toner cartridge 30 has reached the following shipping threshold. The shipping threshold is set to a residual quantity of developer at which the first controller 80 must request the server 3 to ship a new toner cartridge 30. When receiving a shipping request for a toner cartridge 30 and a printer ID, the third controller 320 specifies the registration information in the database 331 associated with a printer ID matching the received printer ID. Since the registration information includes a toner ID, as described above, the third controller 320 can specify the toner ID associated with the received printer ID. In this way, the third controller 320 can determine which of the plurality of image forming apparatuses 1 has a mounted toner cartridge 30 that needs replacing.

When the third controller 320 determines that a shipping request for a toner cartridge 30 was received from an image forming apparatus 1 (S31: YES), the third controller 320 executes the following process. Specifically, in S32 the third controller 320 compares the printer ID received from the image forming apparatus 1 with printer IDs registered in the database 331. In this way, the third controller 320 executes an identification process to specify shipping destination information and location information in the database 331 associated with the printer ID of the image forming apparatus 1 having the toner cartridge 30 that needs replacing. In S33 the third controller 320 executes a transmission process to transmit the shipping destination information and location information specified in S32 to the output device 4.

In S34 the output device 4 acquires the shipping destination information and location information received from the server 3 and in S35 outputs a label 300 on which the shipping destination information and location information are printed.

In S36 the shipping operator of the toner cartridge 30 affixes the label 300 outputted by the output device 4 onto a packing box. In other words, in S36 the shipping operator attaches to the packing box a label 300 that indicates the shipping destination information and location information in the database 331 associated with the printer ID of the image forming apparatus 1 having a toner cartridge 30 that was determined to need replacing. The shipping operator may alternatively attach the label 300 outputted by the output device 4 directly to the new toner cartridge 30 being shipped. In S37 the shipping operator ships the toner cartridge 30 for use on the image forming apparatus 1 to the shipping destination indicated on the label 300.

Hence, by visually confirming the label 300 affixed to the packing box or the newly shipped toner cartridge 30, the user can specify the image forming apparatus 1 in which the newly shipped toner cartridge 30 is to be mounted. In this way, the embodiment can reduce the potential for a user mistakenly mounting the newly shipped toner cartridge 30 in an image forming apparatus 1 other than the image forming apparatus 1 in which the new toner cartridge 30 is to be mounted.

Note that when a service agreement is concluded for an image forming apparatus 1, for example, the third controller 320 may control the output device 4 to output a label 300 on which is printed all location information registered in the database 331. The shipping operator may then ship a starter kit together with the label 300 on which information for each installation site is printed. The starter kit includes toner cartridges 30 and the like for the user that is concluded the service agreement.

Process for Installing a Printer Driver

Figure 7:
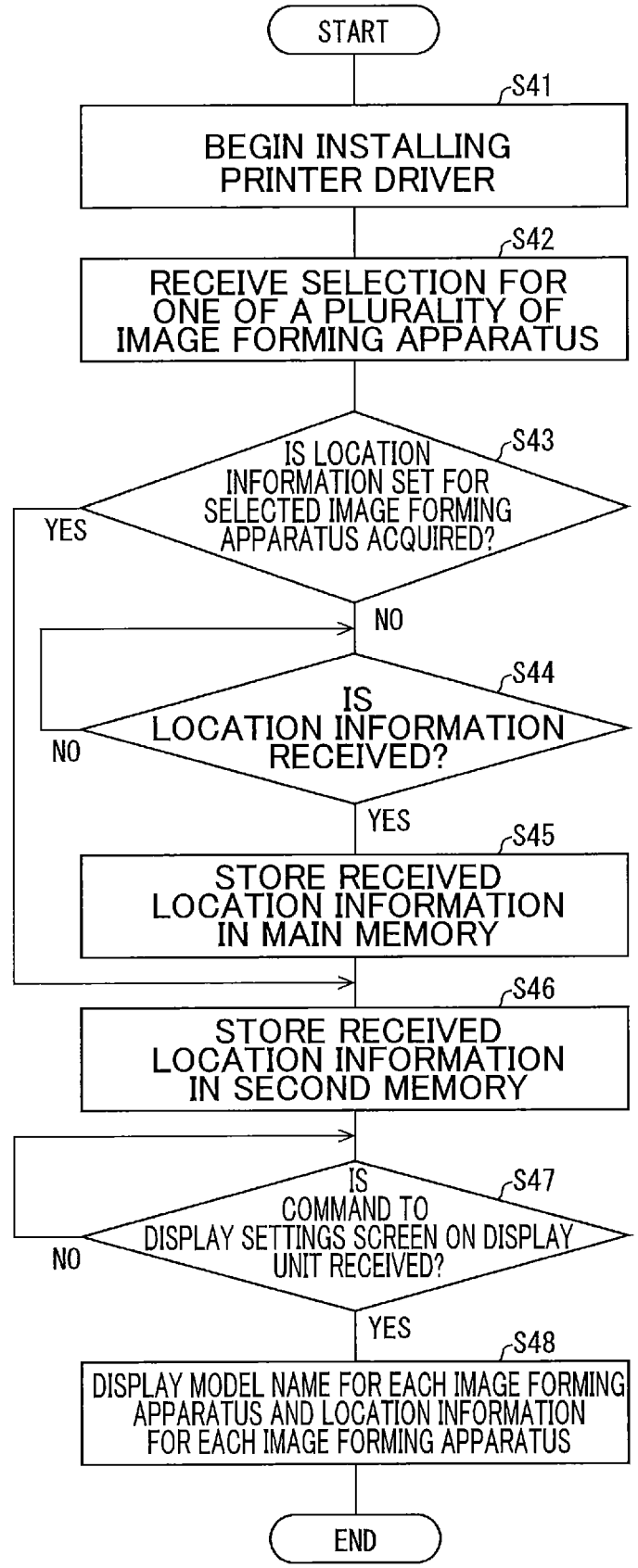
FIG. 7 is a flowchart showing a sample process executed by a PC when installing a printer driver.

FIG. 7 is a flowchart showing a sample process executed by the PC 2 when installing a printer driver. The printer driver is an example of software for controlling the image forming apparatus 1.

As shown in FIG. 7, the second controller 220 begins installing the printer driver in S41. In S42 the second controller 220 receives a selection via the operating unit 250 for one of the plurality of image forming apparatuses 1 to which a print command can be transmitted.

In S43 the second controller 220 determines whether location information set for the selected image forming apparatus 1 could be acquired. Specifically, the second controller 220 transmits a request for the transmission of location information to the selected image forming apparatus 1. When location information is stored in the main memory 15 of the selected image forming apparatus 1, the first controller 80 of the selected image forming apparatus 1 transmits the location information to the PC 2. In this way, the second controller 220 determines that location information could be acquired from the selected image forming apparatus 1. However, if location information is not stored in the main memory 15, the first controller 80 transmits a notification to the PC 2 indicating that location information is not stored. In this way, the second controller 220 determines that location information could not be acquired from the selected image forming apparatus 1.

If the second controller 220 determines that location information could be acquired from the selected image forming apparatus 1 (S43: YES), in S46 the second controller 220 stores the location information acquired in S43 in the second memory 230.

However, if the second controller 220 determines that location information could not be acquired from the selected image forming apparatus 1 (S43: NO), the photosensitive drum 22 executes the following process. In S44 the second controller 220 determines whether location information set for the selected image forming apparatus 1 was received via the operating unit 250.

If the second controller 220 determines that location information was received (S44: YES), in S45 the second controller 220 transmits the received location information to the selected image forming apparatus 1. The first controller 80 of the selected image forming apparatus 1 stores the received location information in the main memory 15. Specifically, the first controller 80 of the selected image forming apparatus 1 may be configured to store the received piece of the location information in the main memory 15. The process of S45 is an example of a step for registering received location information in the selected image forming apparatus 1 in association with the printer ID of the selected image forming apparatus 1. Further, in S46 the second controller 220 stores the received location information in the second memory 230. Note that while a NO determination is made in S44, the second controller 220 executes the process in S44 until location information is received.

When installing a printer driver for an image forming apparatus 1 having no location information set therefor, the second controller 220 can set location information for the image forming apparatus 1 and store this location information in the main memory 15 in the process of S44 and S45. Through the process of S46, the second controller 220 can store location information set for an image forming apparatus 1 in the second memory 230 while installing the printer driver.

In S47 the second controller 220 determines whether a command to display the following settings screen on the display unit 240 was received via the operating unit 250. The settings screen indicates various settings, statuses, and the like for the PC 2 or peripheral devices to the image forming apparatus 1 and the like that are connectable to the PC 2.

When the second controller 220 determines that a command to display the settings screen was received (S47: YES), in S48 the second controller 220 displays the model name for each image forming apparatus 1 and the location information for each image forming apparatus 1 on the display unit 240. Note that if a NO determination was made in S47, the second controller 220 continues executing the process of S47 until the display command is received.

FIG. 8 shows examples of the settings screen, with (A) showing an example of a conventional settings screen 801 and (B) showing an example of a settings screen 802 according to the present disclosure. In FIG. 8, printers A and printers B refer to image forming apparatuses of different models that are connection targets for the PC.

As shown in FIG. 8(A), the printer A connected to the PC is simply displayed as "Printer A (Copy 2)" in the conventional settings screen 801. Consequently, it is difficult to distinguish printers A connected to the PC from printers A not connected to the PC in the settings screen 801. However, the PC 2 can store location information for each image forming apparatus 1 in the second memory 230. Accordingly, in the settings screen 802 of the present disclosure, the printer A connected to the PC 2 can be displayed in association with its location information, as in "Printer A ($4^{th}$ Floor, East Side)" indicated in FIG. 8(B). Hence, this printer A can be distinguished from printers A not connected to the PC 2 in the settings screen 802.

Note that the second controller 220 displays the location information associated with only the printer A connected to the PC 2 in FIG. 8(B), but location information may be displayed in association with all image forming apparatuses 1 that are connectable to the PC 2. In this way, the user can distinguish the installation site of each image forming apparatus 1 by viewing the settings screen.

Supplementary Information

While the image forming apparatus 1 described above is an electrophotographic printer, the image forming apparatus 1 may instead be an inkjet printer. When the image forming apparatus 1 is an inkjet printer, ink cartridges that supply ink may be the cartridges. In this case, the content in the present disclosure is applied to the ink cartridges. Further, a tape cassette for supplying tape as the printing base material may be the cartridge. In this case, the content of this disclosure is applied to the tape cartridge. Further, the present invention is not limited to the form described above in which the drum cartridge 20 has the photosensitive drum 22 and the toner cartridge 30 has the developing roller 32.

First Variation

For example, as a first variation the drum cartridge 20 may possess the developing roller 32 in addition to the cartridge case 21, photosensitive drum 22, and drum memory 23. In this case, the photosensitive drum 22, drum memory 23, and developing roller 32 are provided in the cartridge case 21. Further, the toner cartridge 30 in the first variation possesses the cartridge case 31 and toner memory 33 but not the developing roller 32. The cartridge case 31 accommodates toner. The outer circumferential surface of the developing roller 32 contacts the outer circumferential surface of the photosensitive drum 22 inside the drum cartridge 20.

Second Variation

As a second variation, the image forming apparatus 1 may further include a developing cartridge (not shown) that possesses the developing roller 32. In this case, the drum cartridge 20 has the cartridge case 21, photosensitive drum 22, and drum memory 23. The toner cartridge 30 possesses the cartridge case 31 and toner memory 33 but not the developing roller 32. The cartridge case 31 accommodates toner. In the second variation, the three parts comprising the drum cartridge 20, toner cartridge 30, and developing cartridge are mounted in the main casing 10 with the three parts retained in the cartridge retaining unit 13.

Third Variation

As a third variation, the image forming apparatus 1 may alternatively include a single cartridge (not shown) in place of the drum cartridge 20 and toner cartridge 30. In this case, the single cartridge has a cartridge case, the photosensitive drum 22, memory, and the developing roller 32. The outer circumferential surface of the developing roller 32 contacts the outer circumferential surface of the photosensitive drum 22 inside the cartridge. The cartridge case of the cartridge accommodates toner.

Fourth Variation

As a fourth variation, the drum cartridge 20 or transfer belt 70 may serve as the cartridge in place of the toner cartridge 30, and the details of the present disclosure may be applied to this drum cartridge 20 or transfer belt 70.

While the invention has been described in detail with reference to specific embodiments thereof, it would be apparent to those skilled in the art that many modifications and variations may be made therein without departing from the spirit of the invention, the scope of which is defined by the attached claims.

What is claimed is:

1. A method for specifying a specified image forming apparatus in which a newly shipped cartridge is to be mounted from a plurality of image forming apparatuses, the plurality of image forming apparatuses being enrolled in a service agreement, the method comprising:
    determining, by using a first information processing device, whether a cartridge mounted in the specified image forming apparatus needs replacing, the cartridge being capable of being used in each of the plurality of image forming apparatuses;
    attaching a label to the newly shipped cartridge capable of being used in each of the plurality of image forming apparatuses or to a packing box packing the newly shipped cartridge, the label indicating specific information for the specified image forming apparatus that is associated with identification information of the specified image forming apparatus in which the determining determines that the cartridge needs replacing, the specific information for the specified image forming apparatus being retrieved from a database in which identification information identifying the each of the plurality of image forming apparatuses is associated with specific information for each of the plurality of image forming apparatuses, the specific information for the each of the plurality of image forming apparatuses including location information specifying a location of the each of the plurality of image forming apparatuses from among a plurality of locations of the plurality of image forming apparatuses, the specific information for the specified image forming apparatus including location information specifying a location of the specified image forming apparatus;
    in a case where a new image forming apparatus is enrolled in the service agreement, determining, by the first information processing device, whether the specific information set for the new image forming apparatus matches the specific information specifying another image forming apparatus registered in the database, the another image forming apparatus being different from the new image forming apparatus; and
    in a case where the specific information for the new image forming apparatus does not match the specific information for the another image forming apparatus registered in the database, recording, in the database, the specific information for the new image forming apparatus in association with the identification information which identifies the new image forming apparatus from the plurality of image forming apparatuses.

2. The method according to claim 1, further comprising:
    displaying a reception screen configured to receive entering the specific information different from the specific information previously set for the new image forming apparatus,
    wherein, in the displaying, in a case where the specific information set for the new image forming apparatus does not match the specific information for the another image forming apparatus registered in the database, the specific information set for the new image forming apparatus is displayed on the reception screen.

3. The method according to claim 2, further comprising receiving, by the first information processing device, the specific information for the new image forming apparatus displayed in the reception screen, and
    wherein, in the recording the specific information for the new image forming apparatus, the specific information for the new image forming apparatus received in the receiving is recorded in the database in association with the identification information for the new image forming apparatus.

4. The method according to claim 2, wherein, in the displaying, in a case where the specific information set for new the image forming apparatus matches the specific information for the another image forming apparatus registered in the database, the specific information set for the new image forming apparatus is not displayed on the reception screen.

5. The method according to claim 1, further comprising installing a software for controlling the image forming apparatus to a second information processing device, the second information processing device being configured to communicate with the each of the plurality of image forming apparatuses, the specific information specifying the image forming apparatus being registered to the image forming apparatus in association with the identification information identifying the image forming apparatus.

6. The method according to claim 1, wherein, in the database, the identification information and the location information for each of one or more image forming apparatus are registered in association with identification information identifying a user, wherein in a case where the new image forming apparatus is enrolled in the service agreement for the user, the first information processing device acquires the location information for the one or more image forming apparatus that is different from the new image forming apparatus and that is registered in the database in association with the identification information of the user, and determines whether location information set for the new image forming apparatus matches the acquired location information, and wherein in the case where the location information for the new image forming apparatus does not match the acquired location information, the location information for the new image forming apparatus is registered in association with the identification information of the new image forming apparatus.

7. The method according to claim 6, further comprising:
displaying a reception screen configured to receive entering location information different from the location information previously set for the new image forming apparatus device,
   wherein, in the displaying, in a case where the location information set for the new image forming apparatus does not match the acquired location information, the location information set for the new image forming apparatus is displayed on the reception screen, and
   wherein, in the displaying, in a case where the location information set for new the image forming apparatus matches the acquired location information, the location information set for the new image forming apparatus is not displayed on the reception screen.

8. An information processing device configured to control a plurality of image forming apparatuses which is enrolled in a service agreement, the information processing device comprising:
   a memory configured to store database in which identification information is associated with specific information, the identification information identifying the each of the plurality of image forming apparatuses, the specific information including location information specifying a location of the each of the plurality of image forming apparatuses from among a plurality of locations of the plurality of image forming apparatuses; and
   a controller configured to perform:
      determining whether a cartridge mounted in a specified image forming apparatus of the plurality of image forming apparatuses needs replacing, the cartridge being capable of being used in each of the plurality of image forming apparatuses;
      in a case where, in the determining, the cartridge mounted in the specified image forming apparatus needs replacing, specifying the specific information assigned to the specified image forming apparatus, the specific information being associated with the identification information identifying the specified image forming apparatus;
      transmitting the specific information of the specified image forming apparatus to an output device configured to output a label indicating the specific information;
      in a case where a new image forming apparatus is enrolled in the service agreement, determining whether the specific information set for the new image forming apparatus matches the specific information specifying another image forming apparatus registered in the database, the another image forming apparatus being different from the new image forming apparatus; and
      in a case where the specific information for the new image forming apparatus does not match the specific information for the another image forming apparatus registered in the database, recording, in the database, the specific information for the new image forming apparatus in association with the identification information which identifies the new image forming apparatus from the plurality of image forming apparatuses.

9. The device according to claim 8,
   wherein, in the database, the identification information and the location information for each of one or more image forming apparatus are registered in association with identification information identifying a user,
   wherein in a case where the new image forming apparatus is enrolled in the service agreement for the user, the controller acquires the location information for the one or more image forming apparatus that is different from the new image forming apparatus and that is registered in the database in association with the identification information of the user, and determines whether location information set for the new image forming apparatus matches the acquired location information, and
   wherein in the case where the location information for the new image forming apparatus does not match the acquired location information, the location information for the new image forming apparatus is registered in association with the identification information of the new image forming apparatus.

10. A system comprising:
a first information processing device; and
a second information processing device configured to communicate with the first information processing device, the second information processing device having a controller and a display,
wherein the first information processing device comprises:
a memory configured to store database in which identification information is associated with specific information, the identification information identifying each of a plurality of image forming apparatuses enrolled in a service agreement, the specific information including location information specifying a location of the each of the plurality of image forming apparatuses from among a plurality of locations of the plurality of image forming apparatuses; and
a controller configured to perform:
   determining whether a cartridge mounted in a specified image forming apparatus of the plurality of image forming apparatuses needs replacing, the cartridge being capable of being used in each of the plurality of image forming apparatuses;
   in a case where, in the determining, the cartridge mounted in the specified image forming apparatus needs replacing, specifying the specific information assigned to the specified image forming apparatus, the specific information being associated with the identification information identifying the specified image forming apparatus;
   transmitting the specific information of the specified image forming apparatus to an output device configured to output a label indicating the specific information;
   in a case where a new image forming apparatus is enrolled in the service agreement, determining whether the specific information set for the new image forming apparatus matches the specific information specifying another image forming apparatus registered in the database, the another image forming apparatus being different from the new image forming apparatus;
   requesting the controller of the second information processing device to control the display to display a reception screen for receiving entering the specific information different from the specific information previously set for the new image forming apparatus,
   in a case where the specific information set for the new image forming apparatus does not match the specific information for the another image forming apparatus registered in the database, requesting the controller of the second information processing device to control the display to display the specific information set for the new image forming apparatus on the reception screen;

in a case where the specific information set for new the image forming apparatus matches the specific information for the another image forming apparatus registered in the database, requesting the controller of the second information processing device to control the display not to display the specific information set for the new image forming apparatus on the reception screen; and in the case where the specific information for the new image forming apparatus does not match the specific information for the another image forming apparatus registered in the database, recording, in the database, the specific information for the new image forming apparatus in association with the identification information which identifies the new image forming apparatus from the plurality of image forming apparatuses.

11. The system according to claim 10, wherein, in the database, the identification information and the location information for each of one or more image forming apparatus are registered in association with identification information identifying a user, wherein in a case where the new image forming apparatus is enrolled in the service agreement for the user, the controller of the first information processing device acquires the location information for the one or more image forming apparatus that is different from the new image forming apparatus and that is registered in the database in association with the identification information of the user, and determines whether location information set for the new image forming apparatus matches the acquired location information, wherein the controller of the first information processing device issues a request to display the reception screen configured to receive entering location information different from the location information previously set for the new image forming apparatus device, wherein in the case where the location information set for the new image forming apparatus does not match the acquired location information, the controller of the first information processing device issues a request to display the location information set for the new image forming apparatus on the reception screen, and wherein in the case where the location information set for new the image forming apparatus matches the acquired location information, the controller of the first information processing device issues a request not to display the location information set for the new image forming apparatus on the reception screen, and wherein in the case where the location information for the new image forming apparatus does not match the acquired location information, the location information for the new image forming apparatus is registered in association with the identification information of the new image forming apparatus.

12. A system comprising:

an information processing device; and a plurality of image forming apparatuses, each of which is enrolled in a service agreement and is configured to communicate with the information processing device, wherein the information processing device comprises:

a memory configured to store database in which identification information is associated with specific information, the identification information identifying the each of the plurality of image forming apparatuses, the specific information including location information specifying a location of the each of the plurality of image forming apparatuses from among a plurality of locations of the plurality of image forming apparatuses; and a controller configured to perform:

determining whether a cartridge mounted in a specified image forming apparatus of the plurality of image forming apparatuses needs replacing, the cartridge being capable of being used in each of the plurality of image forming apparatuses;

in a case where, in the determining, the cartridge mounted in the specified image forming apparatus needs replacing, specifying the specific information assigned to the specified image forming apparatus, the specific information being associated with the identification information identifying the specified image forming apparatus;

transmitting the specific information of the specified image forming apparatus to an output device configured to output a label indicating the specific information;

in a case where a new image forming apparatus is enrolled in the service agreement, determining whether the specific information set for the new image forming apparatus matches the specific information specifying another image forming apparatus registered in the database, the another image forming apparatus being different from the new image forming apparatus;

requesting the new image forming apparatus to display a reception screen for receiving entering the specific information different from the specific information previously set for the new image forming apparatus, in a case where the specific information set for the new image forming apparatus does not match the specific information for the another image forming apparatus registered in the database, requesting the new image forming apparatus to display the specific information set for the new image forming apparatus on the reception screen;

in a case where the specific information set for new the image forming apparatus matches the specific information for the another image forming apparatus registered in the database, requesting the new image forming apparatus not to display the specific information set for the new image forming apparatus on the reception screen; and in the case where the specific information for the new image forming apparatus does not match the specific information for the another image forming apparatus registered in the database, recording, in the database, the specific information for the new image forming apparatus in association with the identification information which identifies the new image forming apparatus from the plurality of image forming apparatuses.

13. The system according to claim 12, wherein, in the database, the identification information and the location information for each of one or more image forming apparatus are registered in association with identification information identifying a user, wherein in a case where the new image forming apparatus is enrolled in the service agreement for the user, the controller of the information processing device acquires the location information for the one or more image forming apparatus that is different from the new image forming apparatus and that is registered in the database in association with the identification information of the user, and determines whether location information set for the new image forming apparatus matches the acquired location information, wherein the controller of the information processing device issues a request to display the reception screen configured to receive entering location information different from the location information previously set for the new image forming apparatus device, wherein in the case where the location information set for the new image forming apparatus does not match the acquired location information, the controller of the information processing device issues a request to display the location information set for the new image forming apparatus on the reception screen, wherein in the case where the location information set for new the image forming apparatus matches the acquired location information, the controller of the information processing device issues a request not to display the location information set for the new image forming apparatus on the reception screen, and wherein in the case where the location information for the new image forming apparatus does not match the acquired location information, the location information for the new image forming apparatus is registered in association with the identification information of the new image forming apparatus.

14. A system comprising:

an information processing device; and an output device configured to output a label and is configured to communicate with the information processing device, wherein the information processing device comprises:

a memory configured to store database in which identification information is associated with specific information, the identification information identifying each of a plurality of image forming apparatuses, the specific information including location information specifying a location of the each of the plurality of image forming apparatuses from among a plurality of locations of the plurality of image forming apparatuses; and a controller configured to perform:

determining whether a cartridge mounted in a specified image forming apparatus of the plurality of image forming apparatuses needs replacing, the cartridge being capable of being used in each of the plurality of image forming apparatuses;

in a case where, in the determining, the cartridge mounted in the specified image forming apparatus needs replacing, specifying the specific information assigned to the specified image forming apparatus, the specific information being associated with the identification information identifying the specified image forming apparatus;

transmitting the specific information of the specified image forming apparatus to the output device, to thereby allow the output device to output a label indicating the specific information;

in a case where a new image forming apparatus is enrolled in the service agreement, determining whether the specific information set for the new image forming apparatus matches the specific information specifying another image forming apparatus registered in the database, the another image forming apparatus being different from the new image forming apparatus; and in a case where the specific information for the new image forming apparatus does not match the specific information for the another image forming apparatus registered in the database, recording, in the database, the specific information for the new image forming apparatus in association with the identification information which identifies the new image forming apparatus from the plurality of image forming apparatuses.

15. The system according to claim 14, wherein, in the database, the identification information and the location information for each of one or more image forming apparatus are registered in association with identification information identifying a user, wherein in a case where the new image forming apparatus is enrolled in the service agreement for the user, the controller of the information processing device acquires the location information for the one or more image forming apparatus that is different from the new image forming apparatus and that is registered in the database in association with the identification information of the user, and determines whether location information set for the new image forming apparatus matches the acquired location information, and wherein in a case where the location information for the new image forming apparatus does not match the acquired location information, the location information for the new image forming apparatus is registered in association with the identification information of the new image forming apparatus.

* * * * *